US009709012B2

(12) United States Patent
Curtis et al.

(10) Patent No.: US 9,709,012 B2
(45) Date of Patent: Jul. 18, 2017

(54) INJECTOR CAVITATION DETECTION TEST

(75) Inventors: Paul Curtis, Naperville, IL (US); Raymond Mueller, Addison, IL (US)

(73) Assignee: International Engine Intellectual Property Company, LLC., Lisle, IL (US)

( * ) Notice: Subject to any disclaimer, the term of this patent is extended or adjusted under 35 U.S.C. 154(b) by 323 days.

(21) Appl. No.: 14/394,829

(22) PCT Filed: Apr. 16, 2012

(86) PCT No.: PCT/US2012/033846
§ 371 (c)(1),
(2), (4) Date: Oct. 16, 2014

(87) PCT Pub. No.: WO2013/158070
PCT Pub. Date: Oct. 24, 2013

(65) Prior Publication Data

US 2015/0096361 A1 Apr. 9, 2015

(51) Int. Cl.
*G01M 15/00* (2006.01)
*F02M 65/00* (2006.01)
*F02M 63/00* (2006.01)
*F02M 57/02* (2006.01)

(52) U.S. Cl.
CPC ........ *F02M 65/006* (2013.01); *F02M 57/025* (2013.01); *F02M 63/004* (2013.01); *F02M 65/00* (2013.01); *F02M 2200/04* (2013.01)

(58) Field of Classification Search
USPC .......................................................... 73/114.45
See application file for complete search history.

(56) References Cited

U.S. PATENT DOCUMENTS

| | | | | | |
|---|---|---|---|---|---|
| 3,733,502 | A * | 5/1973 | Curtis | H02K 9/005 | 310/61 |
| 5,954,030 | A * | 9/1999 | Sturman | F02M 59/105 | 123/300 |
| 2003/0006298 | A1* | 1/2003 | Gebhardt | F02M 57/025 | 239/89 |
| 2003/0155437 | A1* | 8/2003 | Lei | F01L 9/02 | 239/533.2 |
| 2005/0217359 | A1* | 10/2005 | Wildman | F02M 65/00 | 73/114.51 |
| 2007/0240500 | A1* | 10/2007 | Pollard | F02M 65/00 | 73/114.48 |
| 2009/0277258 | A1* | 11/2009 | Cueto | F02M 65/001 | 73/114.48 |

* cited by examiner

*Primary Examiner* — Eric S McCall
*Assistant Examiner* — Mohammed E Keramet-Amircola
(74) *Attorney, Agent, or Firm* — Jack D. Nimz; Jeffrey P. Calfa

(57) ABSTRACT

A method and apparatus for determining a characteristic of an injector are set forth. In one example, a compressed gas is applied to the inlet chamber of the injector while the spoolvalve is closed until the pressure of the compressed gas in the inlet chamber reaches a predetermined pressure. A change in pressure of the compressed gas in the inlet chamber is measured over time while the spool valve is closed. The pressure change measurement corresponds to the characteristic of the injector that is to be determined.

15 Claims, 8 Drawing Sheets

| Injector Cavitation Test (Air Pressure with Electronic Data Collection | | | | | | |
|---|---|---|---|---|---|---|
| Injector No. | Pressure Start | Pressure End | Leak rate | Leak Down Time (sec) | | Pass/Fail |
| | (psi) | (psi) | (Liters/ min) | Average | Standard Deviation | |
| 1 | 80 | 20 | 0.18 | 7.26 | 0.03 | Pass |
| 2 | 80 | 20 | 0.2 | 7.02 | 0.01 | Pass |
| 3 | 80 | 20 | 0.44 | 6.01 | 0.03 | Fail |
| 4 | 80 | 20 | 0.7 | 4.16 | 0.01 | Fail |
| 5 | 80 | 20 | 0.82 | 3.94 | 0.01 | Fail |
| 6 | 80 | 20 | 1.1 | 2.47 | 0.01 | Fail |

INJECTOR CAVITATION DETECTION TEST

BACKGROUND

In a hydraulically actuated electronically controlled unit injector, spool valves may be used to control a flow of high-pressure hydraulic fluid to an intensifier chamber. The hydraulic fluid is directed into the intensifier chamber in a timed sequence to operate a piston in the injector body. The high-pressure hydraulic fluid is provided from an inlet chamber of the injector to the intensifier chamber through the spool valve when the spool valve is open. The fluid within the intensifier chamber presses the piston against the bias of a piston spring. When the spool valve is closed, the high-pressure hydraulic fluid within the inlet chamber is cut off from the intensifier chamber. Also, closing the spool valve places the intensifier chamber in fluid communication with an outlet passage of the injector, thereby allowing the hydraulic fluid to exit.

Spool valves have a spool that reciprocates inside the body of the injector. In the open position, the spool valve is moved to a location to form a fluid flow path between the inlet chamber and intensifier chamber while closing off flow from the intensifier chamber to the outlet passage. In the closed position, the spool valve is moved to a further location to form a fluid flow path between the intensifier chamber and the outlet passage while preventing flow of the high-pressure hydraulic fluid from the inlet chamber to the intensifier chamber.

The fluid flow paths created by the spool valve may have sharp edges defined by its grooves and lands. Over time, however, such edges may become worn, abrupt, and/or jagged caused by damage from debris or cavitation. In such instances leakage of the high-pressure hydraulic fluid may occur as it flows through the spool valve, rendering the injector defective and unsuitable for use.

SUMMARY

Examples described herein relate to a method for determining a characteristic of an injector, wherein the injector includes an inlet chamber configured to receive a high-pressure hydraulic fluid that is directed from the inlet chamber to an intensifier chamber through a spool valve for actuating a piston. The injector further includes an outlet passage configured to receive the hydraulic fluid from the intensifier chamber through the spool valve. In one example, a compressed gas is applied to the inlet chamber while the spool valve is closed until the pressure of the compressed gas in the inlet chamber reaches a predetermined pressure. A change in pressure of the compressed gas in the inlet chamber is measured over time while the spool valve is closed. The pressure change measurement corresponds to the characteristic of the injector that is to be determined.

Another example provides a method for determining a characteristic of an injector, wherein the injector includes an inlet chamber configured to receive a high-pressure hydraulic fluid that is directed from the inlet chamber to an intensifier chamber through a spool valve for actuating a piston. The injector further includes an outlet passage configured to receive the hydraulic fluid from the intensifier chamber through the spool valve. In accordance with the method, the injector is coupled to a pressure chamber in a manner that facilitates fluid flow between the pressure chamber and the inlet chamber of the injector. A compressed gas is supplied to the pressure chamber to raise the pressure therein to a predetermined pressure level with the spool valve closed. The supply of the compressed gas to the pressure chamber is inhibited once the predetermined pressure level is reached. A change of pressure of the compressed gas in the inlet chamber is measured over time. The pressure change measurement corresponds to the characteristic of the injector that is to be determined.

Still another example provides an apparatus for use with an injector, wherein the injector includes an inlet chamber configured to receive a high-pressure hydraulic fluid that is directed from the inlet chamber to an intensifier chamber through a spool valve for actuating a piston. The injector further includes an outlet passage configured to receive the hydraulic fluid from the intensifier chamber through the spool valve.

The apparatus includes a compressor configured to supply a compressed gas at a predetermined pressure level. A pressure chamber is configured to receive the compressed gas from the compressor, and a coupling is configured to connect the injector to the pressure chamber in a manner that facilitates fluid flow between the pressure chamber and the inlet chamber of the injector. A spool valve power supply is configured to selectively open and close the spool valve in response to a valve control signal. A sensor is configured to measure a pressure corresponding to pressure of the compressed gas in the inlet chamber of the injector. The pressure output signal is provided by the sensor that corresponds to the measured pressure.

The apparatus also includes a controller that is configured to receive the pressure output signal from the sensor and to provide the valve control signal to the spool valve. The controller is configured to execute a plurality of operations including: 1) actuating the valve control signal to open and close the spool valve; 2) actuating the valve control signal to close the spool valve during application of the compressed gas to the inlet chamber of the injector; and 3) measuring, over time, a change of pressure of the compressed gas in the inlet chamber as indicated by the pressure output signal.

DETAILED DESCRIPTION

Figure 1:
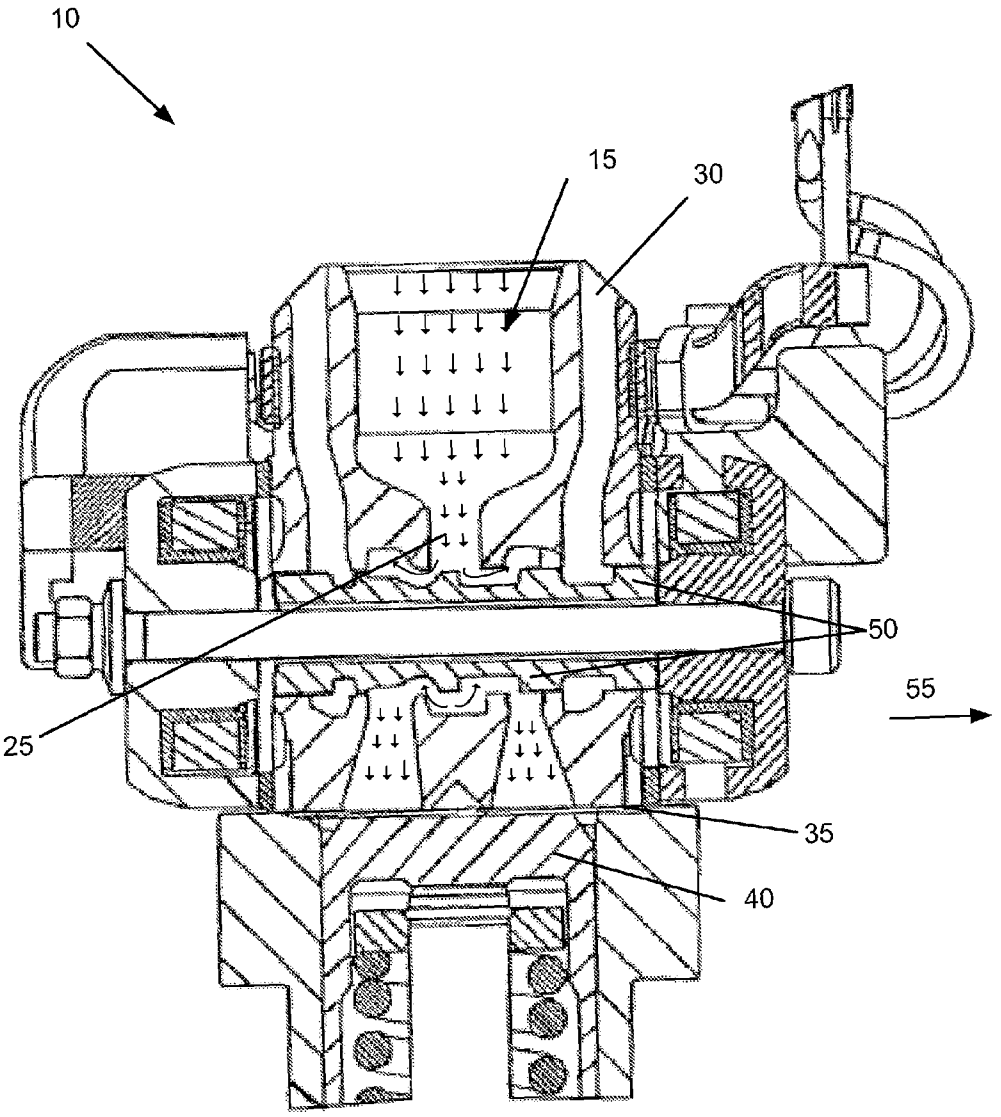
FIG. 1 is a cross-sectional view of an upper portion of an injector with the spool valve open.

FIG. 1 is a cross-sectional view of an upper portion of an injector 10. The injector 10 includes an inlet chamber 15 that is configured to receive a high-pressure hydraulic fluid. The injector 10 also includes an outlet passage 30. An intensifier chamber 35 is disposed above a piston head 40 to alternately receive and discharge high-pressure hydraulic fluid based on the state of a spool valve 50 thereby driving a piston associated with the piston head 40 in a reciprocating manner.

During operation of the injector 10, the intensifier chamber 35 is alternately placed in fluid communication with either the inlet chamber 15 or outlet passage 30 depending on whether the spool valve 50 is open or closed. When the spool valve 50 is open, a fluid flow path is provided from the inlet chamber 15 to the intensifier chamber 35. Also, while in this open state, the spool valve 50 cuts off fluid flow between the intensifier chamber 35 and the outlet passage 30. When the spool valve 50 is closed, a fluid flow path is provided from the intensifier chamber 35 to the outlet passage 30. Further, in the closed state, the spool valve 50 ideally cuts off all fluid flow between the intensifier chamber 35 and the inlet chamber 15.

FIG. 1 shows the fluid flow paths through the injector 10 when the spool valve 50 is in the open state. In this state, a fluid flow path is provided from the inlet chamber 15 to the intensifier chamber 35. The fluid flow path is a result of a lateral displacement of the spool valve 50 in the direction of arrow 55. In this position, the spool valve 50 allows the fluid to flow through grooves of the spool valve 50 from the inlet chamber 15 to the intensifier chamber 35.

Figure 2:
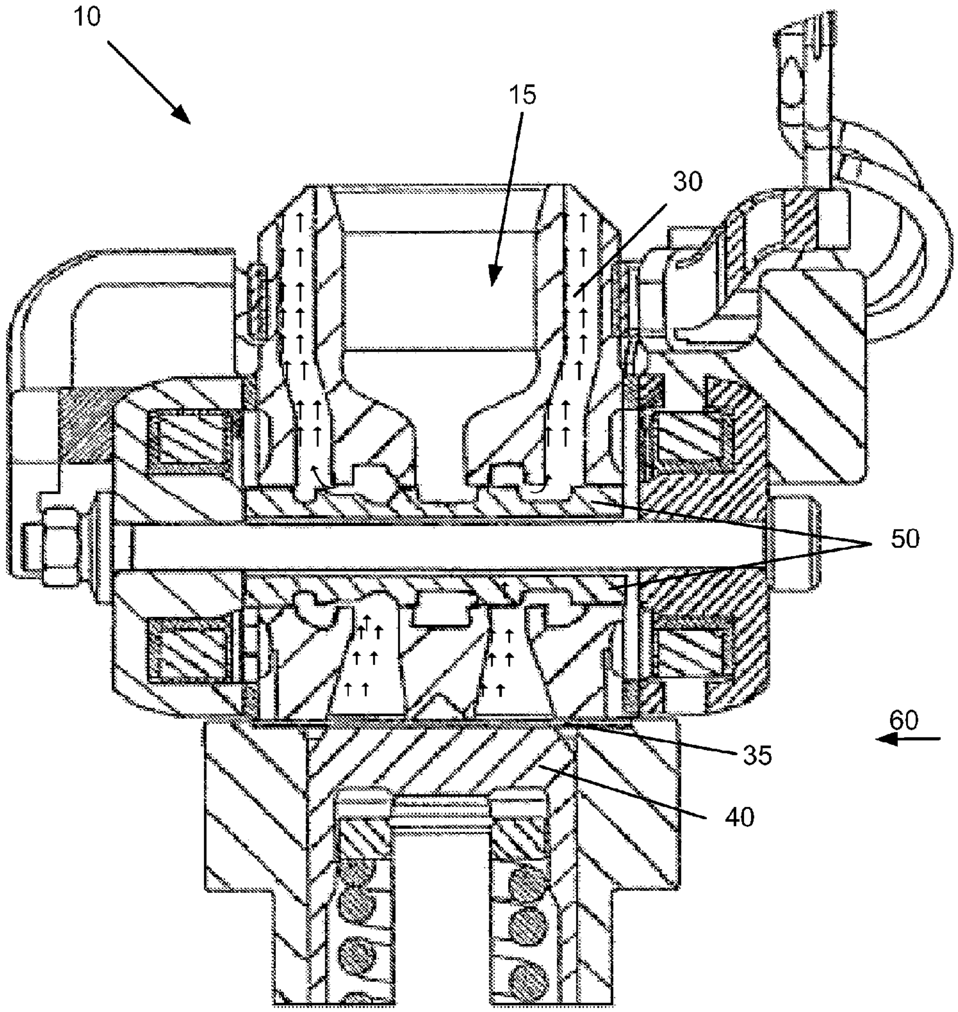
FIG. 2 is a cross-sectional view of the injector shown in FIG. 1 with the spool valve closed.

FIG. 2 shows the fluid flow paths through the injector 10 when the spool valve 50 is in the closed state. In this state, a fluid flow path is provided from the intensifier chamber 35 to the outlet passage 30. The fluid flow path is a result of a lateral displacement of the spool valve 50 in the direction of arrow 60. In this position, lands of the spool valve 50 allow the fluid to flow through grooves on the spool valve 50 from the intensifier chamber 35 to the outlet passage 30 while preventing fluid flow from the inlet chamber and 152 the intensifier chamber 35.

A characteristic of the injector 10 may be determined by providing the injector 10 with a compressed gas, such as compressed air, instead of the high-pressure hydraulic fluid. Characteristics of the injector 10 may be detected by measuring pressure changes of the compressed gas in the inlet chamber 15 over time. Such measured pressure changes may be correlated with injector characteristics such as injector quality, spool valve leakage, and the like.

Figure 3:
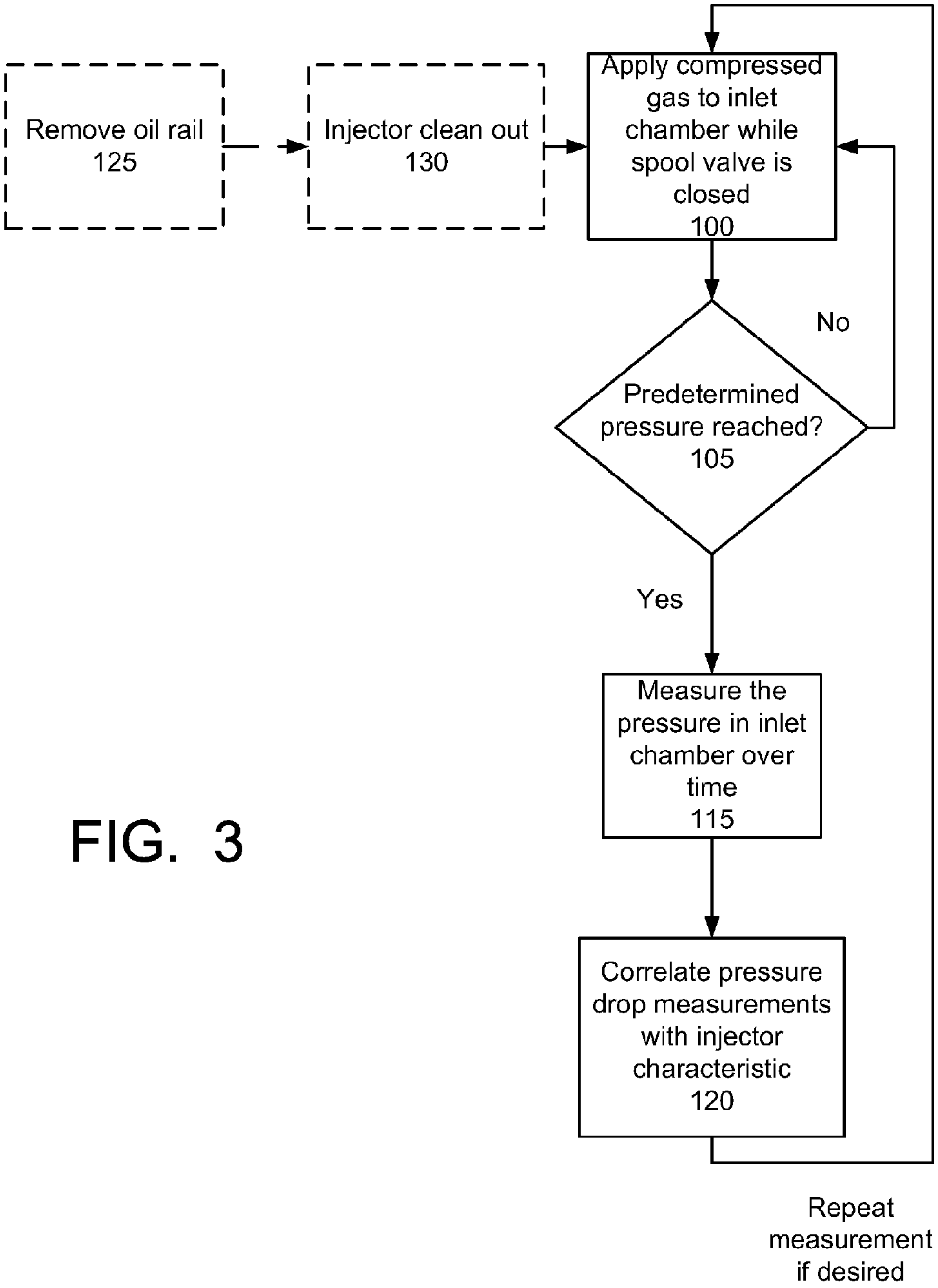
FIG. 3 is a flowchart showing one example of a set of operations that may be used to determine and/or measure a characteristic of an injector.

FIG. 3 is a flowchart showing one example of a set of operations that may be used to determine and/or measure a characteristic of the injector 10. At operation 100, a compressed gas is applied to the inlet chamber 15 while the spool valve 50 is in the closed state. The compressed gas is applied until gas in the inlet chamber reaches a predetermined pressure. While in the closed state, the spool valve 50 prevents the compressed gas from flowing to the outlet passage 30 as well as to the intensifier chamber 35.

A check is made at operation 105 to determine whether the inlet chamber 15 is at the predetermined pressure. If not, inlet chamber 15 continues to receive the compressed gas at operation 100. Once the predetermined pressure is reached as determined at operation 105, the compressed gas is no longer provided to the inlet chamber 15. This results in retention of the compressed gas in the inlet chamber 15 at the initial predetermined pressure, and in prevention of further flow of the compressed gas therefrom to the intensifier chamber 35.

One or more measurements of the pressure of the compressed gas in the inlet chamber 15 are made at operation 115. The measurements are taken over time while the spool valve 50 is closed. The spool valve 50 may be opened once the measurements have been completed. Additionally, or in the alternative, the spool valve 50 may be opened once the pressure within the inlet chamber 15 reaches a predetermined final pressure level.

At operation 120, pressure change measurements, such as the pressure drop within the inlet chamber 15, are correlated with the characteristic of the injector 10 that was to be determined. Although the correlation may be made with a single measurement, multiple measurements taken over multiple test cycles may also be used. Each such test cycle may include at least operation 100 through operation 115. The characteristic of the injector 10 may be at least partially determined by a rate of change of the pressure in the inlet chamber 15 using measurements from two or more arbitrary points in time. Additionally, or in the alternative, the characteristic may be at least partially determined by measuring the time it takes for the pressure within inlet chamber 15 to drop from a first predetermined pressure level to a second predetermined pressure level. Other manners of employing the measured pressure changes may also be used.

Prior to executing a test cycle, some preliminary operations may take place. Two such operations are shown in FIG. 3. In operation 125, the oil rail of an engine to which one or more of the injectors are attached is removed and replaced by a tool that provides a pressure chamber for applying the compressed air to the injectors. An apparatus including such a tool is discussed below.

Figure 4:
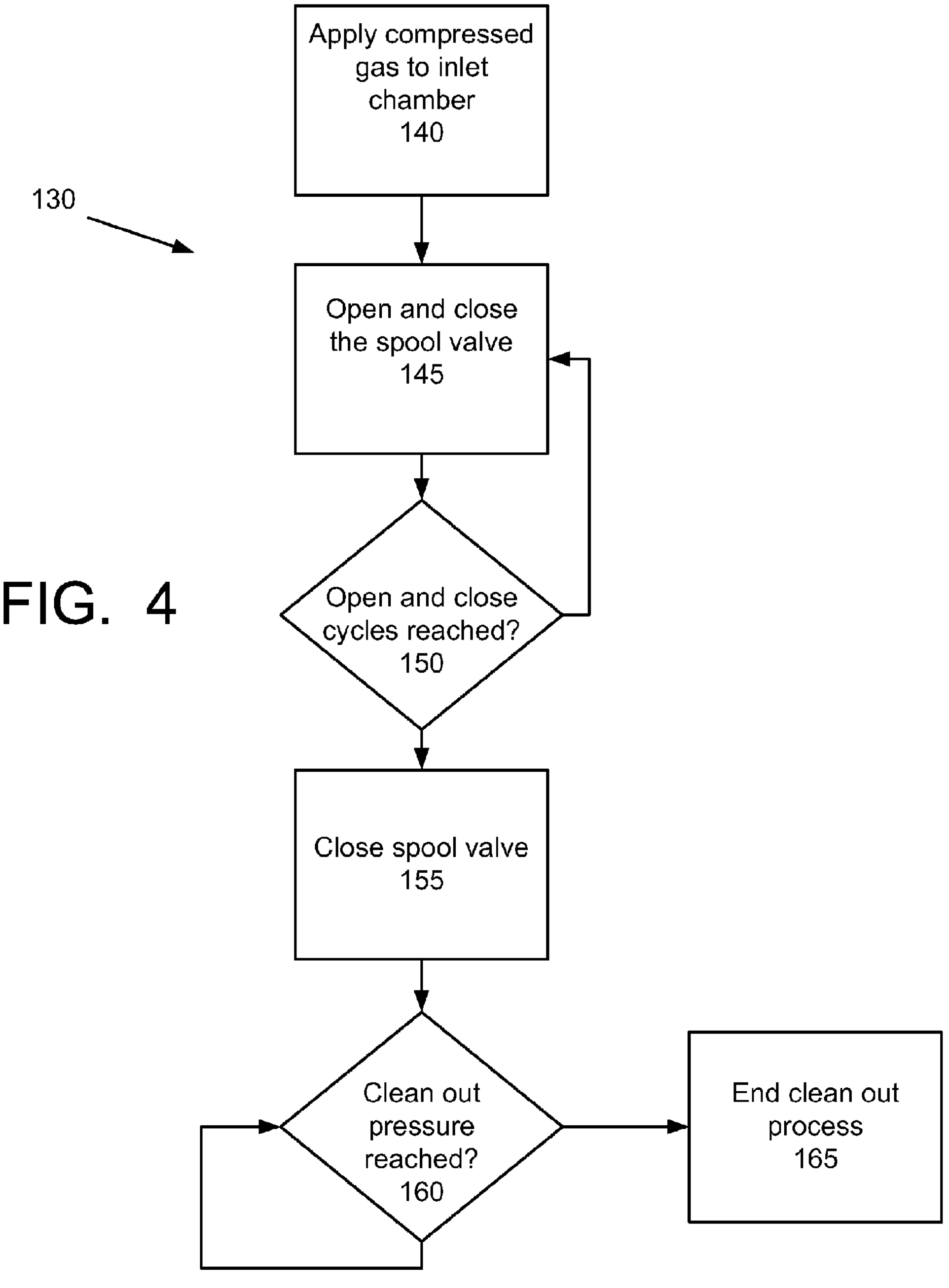
FIG. 4 is a flowchart showing one example of a set of operations that may be used in the clean out cycle shown in FIG. 3.

At operation 130, an injector clean out process may be executed. During the injector clean out process, hydraulic fluid and other debris are removed from the inlet chamber 15, spool valve 50, intensifier chamber 35, and outlet passage 30. One example of a clean out process is shown in FIG. 4. In this example, the compressed gas is used as the cleaning medium. At operation 140, the compressed gas is applied to the inlet chamber 15. The spool valve 50 is opened and closed while the compressed gas is applied to the inlet chamber 15. A predetermined number of open and close cycles of the spool valve 50 may be used. In such instances, a check is made at operation 150 to determine whether the predetermined number of cycles has been reached. If not, the open and close cycles continue at operation 145.

Once the predetermined number of cycles have been executed, the spool valve 50 is closed at operation 155. A waiting cycle may be initiated at operation 160. During this waiting cycle, the pressure in the inlet chamber 15 may be measured until a clean out pressure has been reached. On reaching the clean out pressure, the clean out process may be stopped at operation 165 and the test cycle shown in FIG. 3 is executed. Alternatively, such a waiting cycle may be omitted and the clean up process may proceed immediately to operation 100 of FIG. 3 with the spool valve 50 closed.

Figure 3A:
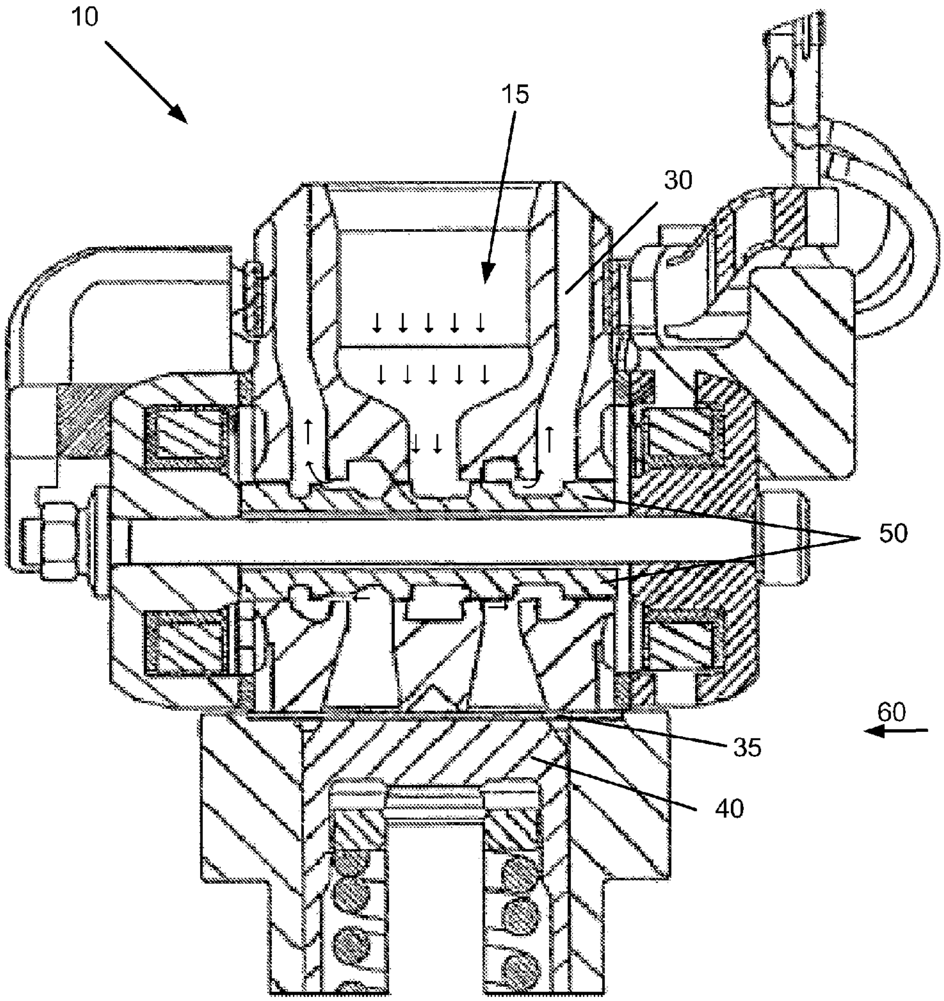
FIG. 3A is a cross-sectional view of the injector when a compressed gas is applied to the inlet chamber.

FIG. 3A shows the injector 10 once the supply of compressed gas has been cut off. As shown, the spool valve 50 is in the closed state thereby preventing flow of the compressed gas between the inlet chamber 15 and outlet passage 30 as well as between the inlet chamber 15 and the intensifier chamber 35. However, the seal provided by the spool valve 50 in the closed state is often not ideal. Accordingly, as shown by the arrows in FIG. 3A, there will be some leakage of the compressed gas between the inlet chamber 15 and one or both of the outlet passage 30 and intensifier chamber 35. This leakage results in a gradual pressure drop of the compressed gas within the inlet chamber 15 over time.

Figure 5:
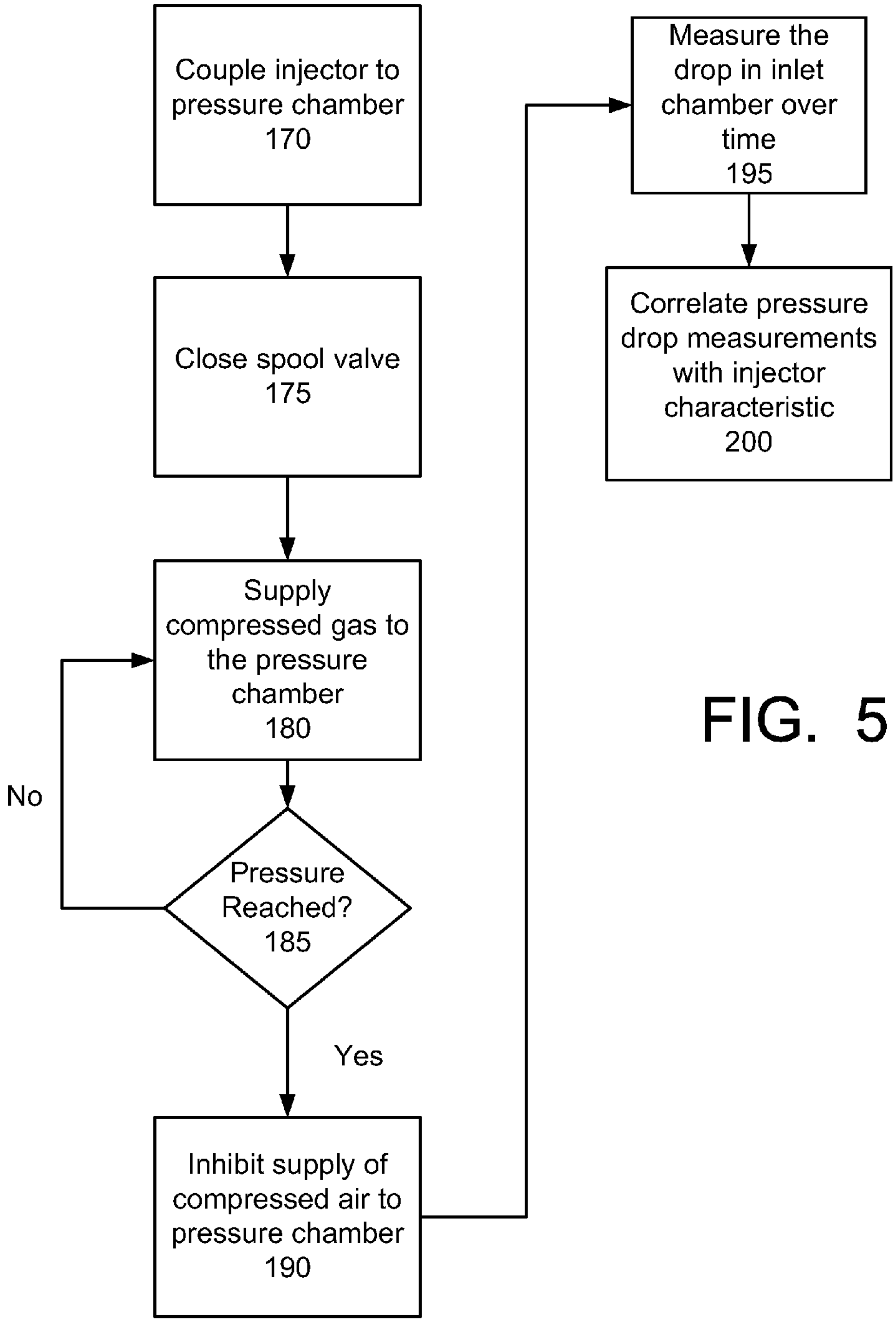
FIG. 5 is a flowchart showing a further example of a set of operations that may be used to determine and/or measure a characteristic of an injector.

FIG. 5 is a flowchart showing a further example of a set of operations that may be used to determine and/or measure a characteristic of the injector 10. At operation 170, the injector 10 is coupled to a pressure chamber in a manner that facilitates fluid flow between the pressure chamber and the inlet chamber 15 of the injector 10. The pressure chamber, for example, may be in the form of a partial rail configured as a tool to accommodate a single or multiple injectors 10 using corresponding injector couplings. At operation 175, the spool valve 50 is closed and compressed gas is supplied to the injector 10, for example, by a compressor to the pressure chamber. The compressed gas is supplied at operation 180 until the pressure of the compressed gas in the inlet chamber 15 is at least approximately equal to the predetermined pressure level of the compressed gas in the pressure chamber. This pressure determination is made at operation 185. Once the predetermined pressure is reached, the supply of the compressed gas to the inlet chamber 15 is inhibited at operation 190.

One or more measurements of the pressure of the compressed gas in the inlet chamber 15 are made at operation 195. The measurements are taken over time while the spool valve 50 is closed. The spool valve 50 may be opened once the measurements have been completed. Additionally, or in the alternative, the spool valve 50 may be opened once the pressure within the inlet chamber 15 reaches a predetermined final pressure level.

At operation 200, the pressure change measurements are correlated with the characteristic of the injector 10 that was to be determined. Although the correlation may be made with a single measurement, multiple measurements taken over multiple test cycles may also be used. The characteristic of the injector 10 may be based on any use of the pressure change measurements noted above.

Figure 6:
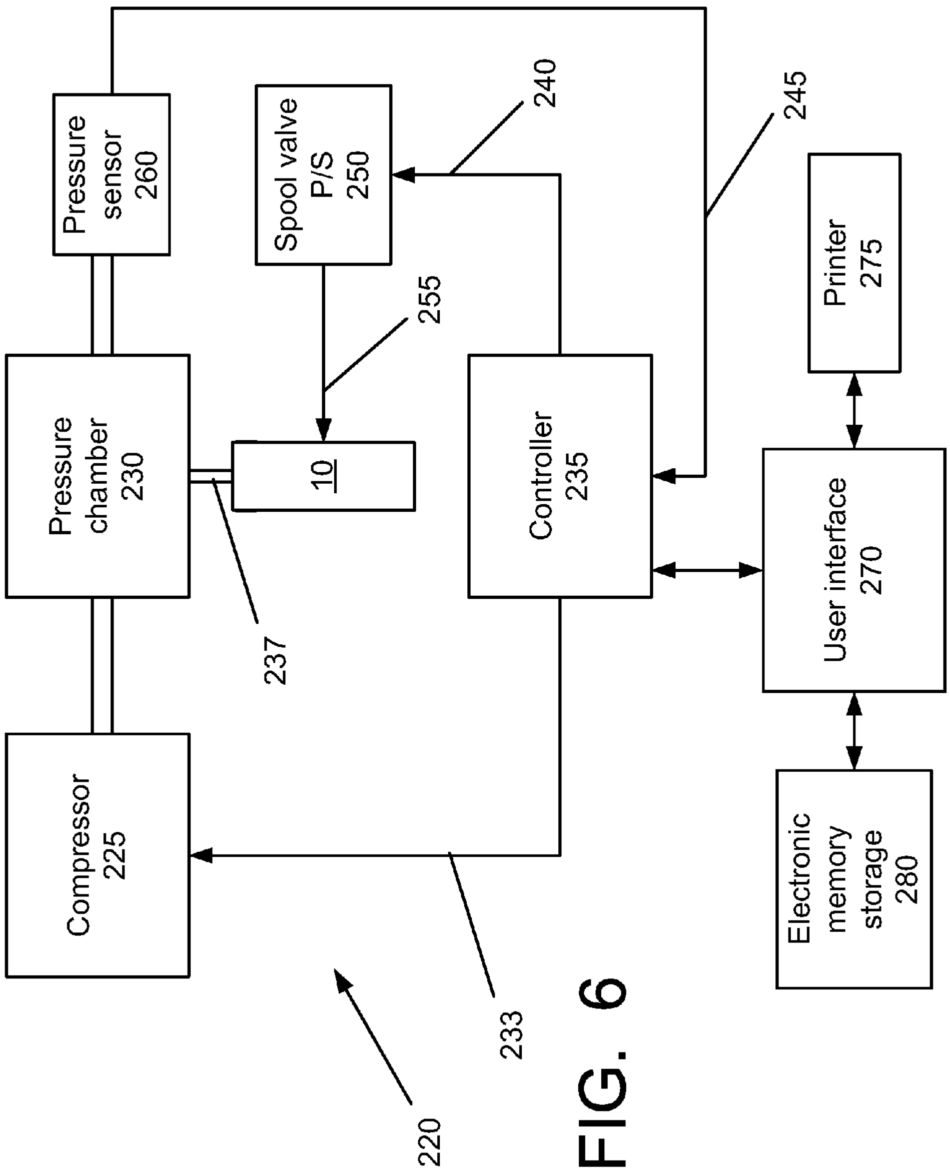
FIG. 6 is a block diagram of an exemplary apparatus that may be used to implement the operations shown in FIGS. 3-5.

FIG. 6 is a block diagram of an exemplary apparatus 220 that, for example, may be used to implement the operations shown in FIGS. 3-5. The apparatus 220 includes a compressor 225 that is configured to supply a compressed gas at a predetermined pressure level at its output. A pressure chamber 230 is configured to receive the compressed gas from the compressor 225 and a coupling 237 is provided to connect the pressure chamber to the injector 10. The coupling 237 is connected in a manner that facilitates fluid flow between the pressure chamber 230 and the inlet chamber 15 of the injector 10.

A controller 235 is configured to control various elements of the apparatus 220. In the example shown here, the controller 235 is configured to generate a valve control signal 240 and to receive a pressure output signal 245. The valve control signal 240 is provided to a spool valve power supply 250. The spool valve power supply 250 responds to the valve control signal 240 by generating an actuating signal 255. The actuating signal 255, in turn, controls the state of the spool valve 50 of the injector 10 to selectively drive it to the open and closed states.

The controller 235 is also configured to control when the compressed gas is applied to the injector 10, and when it is effectively sealed off from further application of the compressed gas. In one example, a compressor control signal 233 may be provided to the compressor 225 to control the pressure of the compressed gas supplied to the pressure chamber 230. Additionally, or in the alternative, the compressor control signal 233 may be used to effectively disconnect the compressor 225 from the pressure chamber 230 by turning off the compressor 225 or actuating a valve between the compressor 225 and the pressure chamber 230. Still further, the controller 235 may be used to open and close a valve in coupling 237.

The controller 235 receives the pressure output signal 245 from a pressure sensor 260. The pressure sensor 260 is configured to measure a pressure corresponding either directly or indirectly to the pressure of the compressed gas in the inlet chamber 15. As such, the pressure output signal 245 received by the controller 235 from pressure sensor 260 corresponds either directly or indirectly to the pressure within the inlet chamber 15. For example, the pressure sensor 260 may be coupled to measure the pressure of the gas within the pressure chamber 230 which, in turn, corresponds to the pressure in the inlet chamber 15. Additionally, or in the alternative, the pressure sensor 260 may be provided in the coupling 237 to obtain a direct measurement of the pressure in the inlet chamber 15.

Apparatus 220 may also include a user interface 270. The user interface 270 may be used to enter the parameters that are to be used during the test cycles. Test cycles may also be initiated through user interface 270. Further, the results of the injector test may be provided to the user in one or more of a variety of manners using visual indicia corresponding to the results. For example, the results may be displayed as pass/fail using a lamp, such as an LED. Additionally, or in the alternative, the results may be provided on an electronic display and/or be available for printing on a printer 275 or storage in electronic memory 280.

During operation, the apparatus 220 may be configured to execute any of the operations shown in FIGS. 3-5. Other operations associated with determining a measurement characteristic of the injector 10 may also be executed by the apparatus 220.

In one example, the controller 235 is configured to execute a plurality of operations associated with determining whether leakage between the inlet chamber 15 and the outlet passage 30 is excessive. Such excessive leakage indicates that the spool valve 50 is unsuitable for initial or further use. It has been realized that a spool valve 50 having excessive leakage has likely experienced excessive cavitation during operation with high-pressure hydraulic fluids and that this cavitation will likely continue under further use.

To detect leakage, the injector 10 is connected to the pressure chamber 230 through coupling 237. The controller 235 actuates the valve control signal 240 causing the spool valve power supply 250 to drive the actuating signal 255 to a state in which the spool valve 50 is closed. Compressor 225 is engaged by the controller 235 to provide compressed gas to the inlet chamber 15 while the spool valve 50 is in the closed state. Compressed gas is provided until the pressure output signal 245 from pressure sensor 260 indicates that the pressure of the compressed gas in the inlet chamber 15 is at least approximately equal to the predetermined pressure level in the pressure chamber 230. Upon reaching the predetermined pressure level, the compressor 225 is effectively removed and further provision of compressed gas to the inlet chamber 15 is inhibited. This places the inlet chamber 35 in an initial pressurized state. Over time, the controller 235 receives pressure sensor measurements from pressure sensor 260. These measurements are used to determine a change of pressure, such as a pressure drop, of the compressed gas in the inlet chamber 15 over such time. As noted above, a fixed measurement time may be used over which measurements of the pressure drop are made. Additionally, or in the alternative, the time over which the pressure measurements are made may correspond to the time it takes for the pressure in inlet chamber 15 to drop over a given pressure range.

Figures 7, 8:
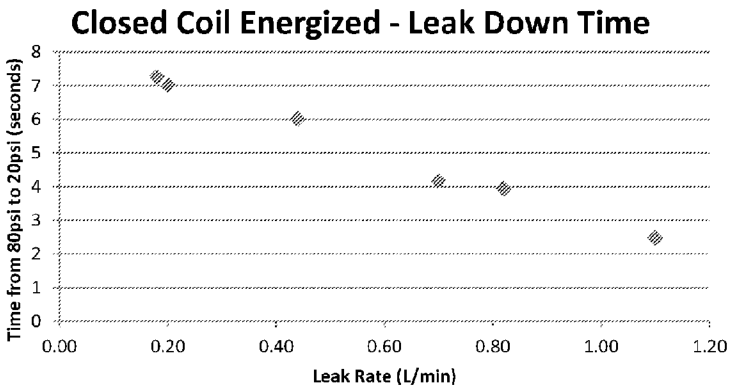
FIG. 7 is a graph of exemplary test results for a plurality of injectors.
FIG. 8 shows the test results of FIG. 7 in a tabular format.

FIG. 7 is a graph of exemplary test results for a plurality of injectors, while FIG. 8 shows the test results in a tabular format. In this example, there were six injectors that were individually tested. The start pressure in the inlet chamber 15 for each test began at 80 psi and ended at 20 psi, although other start and end pressures may also be used. The average leakage for each injector was taken over multiple test cycles. Further, the standard deviation for the leakage over multiple test cycles executed on each injector was calculated.

Injectors having a lower leak down time have higher leakage through the spool valve of the injector. The values of either or both the leak down time and leak rate were used to decide whether the corresponding injector passed or failed the test. Predetermined values or value ranges for such pressures and/or times may be compared with the measured values to decide whether an injector passed or failed the test. Such predetermined values and/or value ranges may be obtained quantitatively or empirically using experimental test results.

In the exemplary test measurements, injector 1 had a leak down time of 7.26 seconds (corresponding to a leak rate of 0.18 L/min.) and passed the test. Injector 2 likewise passed the test, having a leak down time of 7.02 seconds (corresponding to a leak rate of 0.2 L/min.) However, injectors 3-6 have substantially lower leak down times and corresponding higher leak rates when compared to injectors 1 and two. Injectors 3-6, therefore, were found to fail the test.

While various examples of the methods and apparatus have been illustrated and described, it should be appreciated that the principles associated with each of the disclosed examples may be extended while still falling within the scope of the following claims.

The invention claimed is:

1. A method for determining a characteristic of an injector, wherein the injector includes
- an inlet chamber configured to receive a high-pressure hydraulic fluid that is directed from the inlet chamber to an intensifier chamber through a spool valve for actuating a piston, and an outlet passage configured to receive the hydraulic fluid from the intensifier chamber through the spool valve, the method comprising:
- applying a compressed gas to the inlet chamber while the spool valve is closed until pressure of the compressed gas in the inlet chamber reaches a predetermined pressure; and
- measuring, over time, a change in pressure of the compressed gas in the inlet chamber, wherein the measurement takes place with the spool valve closed, and wherein the pressure change measurement corresponds to the characteristic of the injector that is to be determined.

2. The method of claim 1, wherein the characteristic of the injector that is to be determined comprises leakage of hydraulic fluid between the inlet chamber and outlet passage through the spool valve.

3. The method of claim 1, wherein the spool valve is opened once the pressure in the inlet chamber has decreased to a predetermined final pressure level.

4. The method of claim 1, wherein the characteristic of the injector is at least partially determined by a rate of change in the pressure in the inlet chamber.

5. The method of claim 1, wherein the pressure change measurement is used to determine whether the spool valve of the injector is likely subject to cavitation when operated in an engine.

6. The method of claim 1, further comprising removing a rail from an engine prior to applying the compressed gas.

7. The method of claim 1, further comprising executing an injector clean out operation prior to a start of an initial testing cycle.

8. The method of claim 7, wherein the injector clean out operation comprises applying the compressed gas to the inlet chamber while opening and closing the spool valve.

9. The method of claim 1, wherein the pressure change measurement is made over a plurality of testing cycles, and wherein each testing cycle comprises the applying of the compressed gas, the closing of the spool valve, and the measurement of the pressure change, and wherein the pressure change measurements made over the plurality of testing cycles are aggregated to determine the characteristic of the injector.

10. A method for determining a characteristic of an injector, wherein the injector includes an inlet chamber configured to receive a high-pressure hydraulic fluid that is directed from the inlet chamber to an intensifier chamber through a spool valve for actuating a piston, and an outlet passage configured to receive the hydraulic fluid from the intensifier chamber through the spool valve, the method comprising:
- coupling the injector to a pressure chamber in a manner that facilitates fluid flow between the pressure chamber and the inlet chamber of the injector;
- supplying a compressed gas to the pressure chamber to raise the pressure therein to a predetermined pressure level with the spool valve closed;
- inhibiting the supply of the compressed gas to the pressure chamber once the predetermined pressure level is reached; and
- measuring, over time, a change of pressure of the compressed gas in the inlet chamber, wherein the pressure change measurement corresponds to the characteristic of the injector that is to be determined.

11. The method of claim 10, wherein the characteristic that is to be determined is leakage between the inlet chamber and outlet passage through the spool valve.

12. The method of claim 10, wherein the pressure in the inlet chamber is determined, at least in part, by measuring pressure of the compressed gas in the pressure chamber.

13. The method of claim 10, wherein multiple pressure change measurements are made over a plurality of test cycles, and wherein the multiple pressure change measurements are aggregated to provide an aggregated measurement value corresponding to the characteristic that is to be determined.

14. An apparatus for use with an injector, wherein the injector includes an inlet chamber configured to receive a high-pressure hydraulic fluid that is directed from the inlet chamber to an intensifier chamber through a spool valve for actuating a piston, and an outlet passage configured to receive the hydraulic fluid from the intensifier chamber through the spool valve, the apparatus comprising:
- a compressor configured to supply a compressed gas at a predetermined pressure level;
- a pressure chamber configured to receive the compressed gas from the compressor;
- a coupling configured to connect the injector to the pressure chamber in a manner that facilitates fluid flow between the pressure chamber and the inlet chamber of the injector;
- a spool valve power supply configured to selectively open and close the spool valve in response to a valve control signal;
- a sensor configured to measure a pressure corresponding to pressure of the compressed gas in the inlet chamber of the injector, the sensor providing a pressure output signal corresponding to the measured pressure; and a controller configured to receive the pressure output signal from the sensor and to provide the valve control signal to the spool valve, wherein the controller is configured to execute a plurality of operations including:

actuating the valve control signal to open and close the spool valve;

actuate the valve control signal to close the spool valve during application of the compressed gas to the inlet chamber of the injector; and measuring, over time, a change of pressure of the compressed gas in the inlet chamber as indicated by the pressure output signal.

15. The apparatus of claim 14, wherein the controller is further configured to display visual indicia corresponding to the pressure change measurements.

* * * * *